Aug. 24, 1943.     G. J. KONUCIK     2,327,721
STERILIZER
Filed July 7, 1942     2 Sheets-Sheet 1

Inventor
George J. Konucik

By Clarence A. O'Brien
and Harvey B. Jacobson
Attorneys

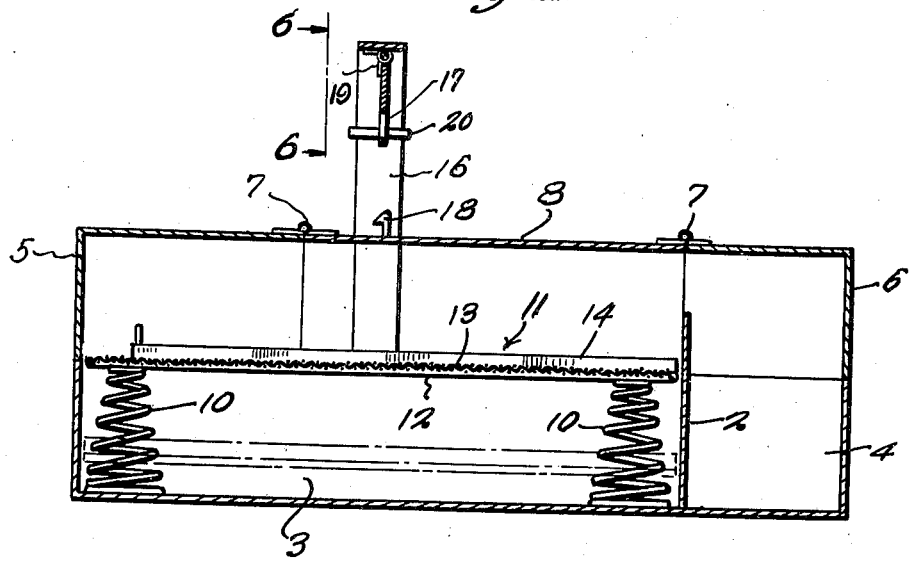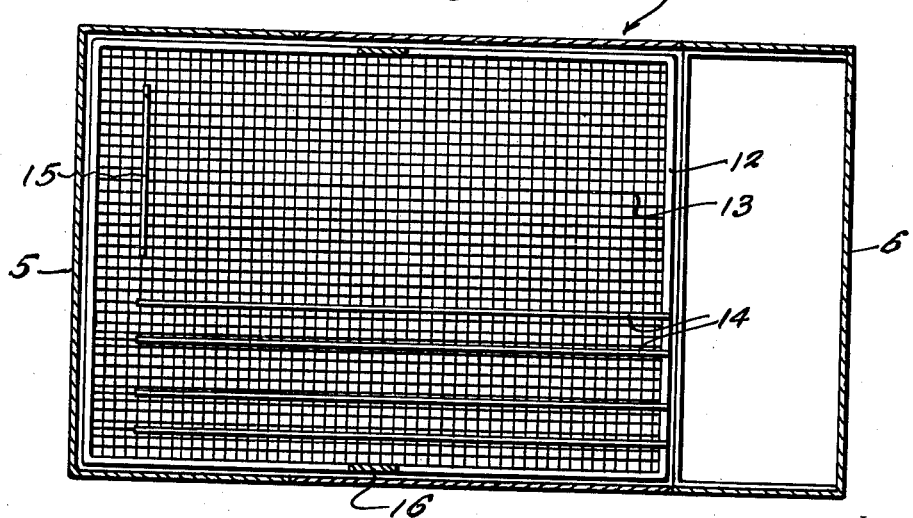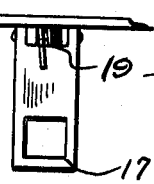

Patented Aug. 24, 1943

2,327,721

UNITED STATES PATENT OFFICE 2,327,721

STERILIZER

George J. Konucik, Norfolk, Va.

Application July 7, 1942, Serial No. 450,051

3 Claims. (Cl. 21—87)

The present invention relates to new and useful improvements in sterilizers, particularly for barber shops and beauty parlors, although it will be understood, of course, that the device may be used for any other purpose for which it may be found adapted and desirable. The primary object of the invention is to provide, in a manner as hereinafter set forth, a device of the character described comprising a novel combination and arrangement whereby various articles or instruments may be first sterilized by immersion in a suitable disinfecting solution and then, while drying, treated to the action of fumes for further sterilization.

Another very important object of the invention is to provide a sterilizer of the aforementioned character which embodies novel means for raising the articles out of the solution.

Other objects of the invention are to provide a sterilizer of the character set forth which will be comparatively simple in construction, strong, durable, highly efficient and reliable in use, compact, light in weight, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 4 is a view in vertical longitudinal section, taken substantially on the line 4—4 of Figure 2.

Figure 5 is a view in horizontal section, taken substantially on the line 5—5 of Figure 1.

Figure 6 is a detail view in elevation, looking at the tray handle securing means from the line 6—6 in Figure 4.

Figure 1:
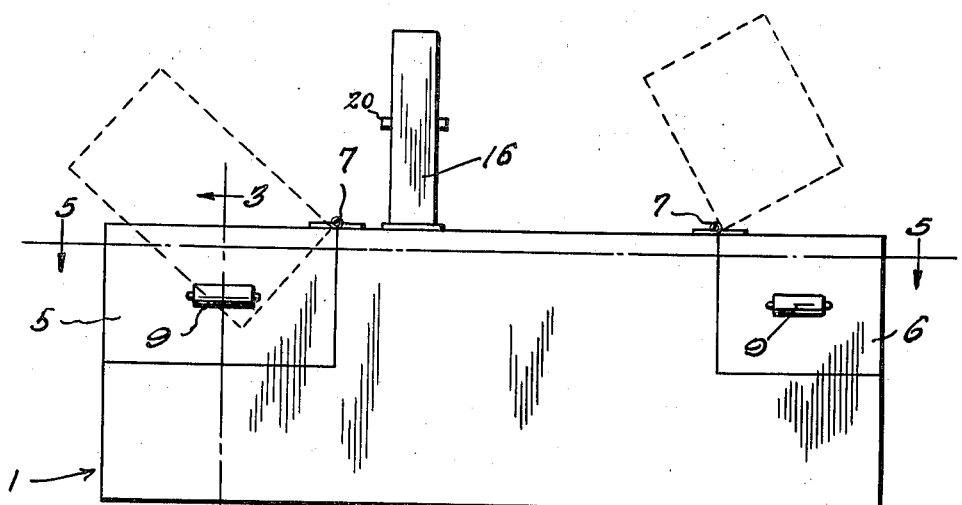
Figure 1 is a view in side elevation of a sterilizer constructed in accordance with the present invention.
Figure 2:
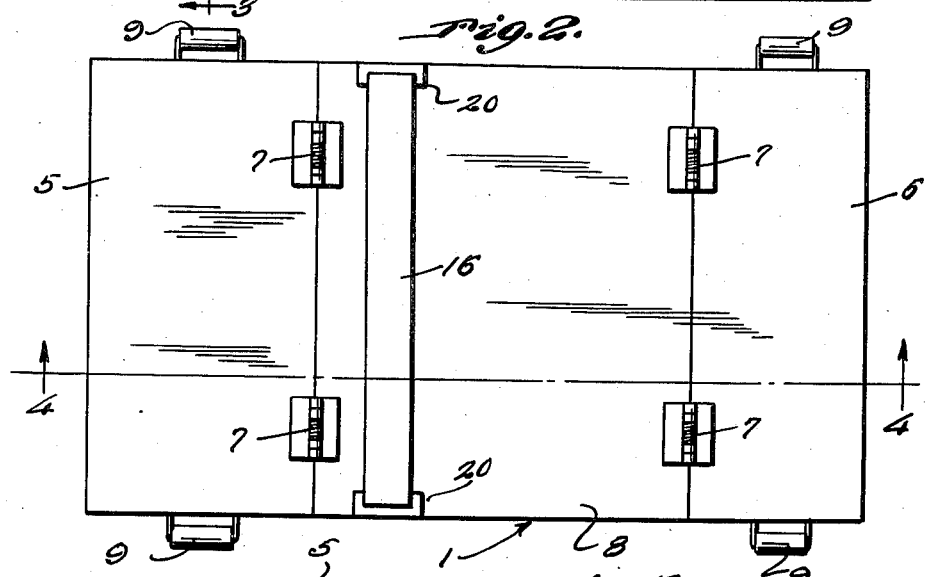
Figure 2 is a top plan view thereof.
Figure 3:
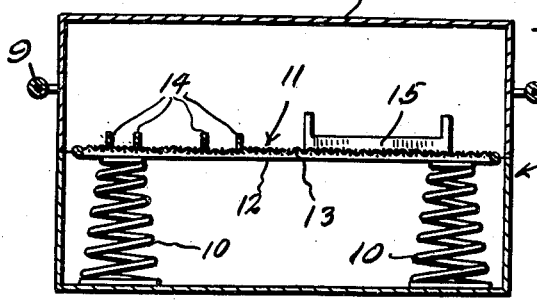
Figure 3 is a cross-sectional view through one end portion of the device, taken substantially on line 3—3 of Figure 1.

Referring now to the drawings in detail, it will be seen that the embodiment of the invention which has been illustrated comprises a cabinet or container 1 of suitable dimensions and material, said container being substantially rectangular in plan. Adjacent one end, the container 1 has mounted transversely in its lower portion a partition 2. The partition 2 provides comparatively large and small compartments 3 and 4, respectively, in the container 1. The compartment 3 is for the reception of a suitable disinfecting solution. The comparatively small compartment 4 is for the reception of a container having therein a suitable medium for giving off disinfecting fumes.

On one end, the container 1 includes a vertically swinging upper portion constituting a closure 5 providing access to the compartment 3. A substantially similar closure 6 is provided on the other end portion of the container 1 for access to the compartment 4. Spring hinges 7 secure the closures 5 and 6 to the top 8 of the container 1. Roller handles 9 are provided to facilitate opening the closures 5 and 6.

Conical coil springs 10 yieldingly support a tray 11 for vertical movement in the compartment 3 of the container 1. In the embodiment shown, the tray 11 comprises a frame 12 having mounted therein a screen 13. The tray 11 further includes pairs of spaced, parallel longitudinally extending bars 14 which are adapted to receive therebetween razors and other articles or instruments. The tray 11 still further includes a transverse bar 15 for supporting one end portion of combs, et cetera, to facilitate picking such articles up.

The tray 11 is provided with a substantially U-shaped handle or bail 16 which is slidable through slots which are provided therefor in the top 8 of the container 1. Mounted for swinging movement on the bight portion of the substantially U-shaped handle or bail 16 and depending therefrom is a loop 17. A hook 18 which rises from the top 8 of the container 1 is engageable in the loop 17 for releasably securing the tray 11 in lowered position in the compartment 3. The loop 17 is connected to the handle 16 by a spring hinge 19 which engages said loop with the hook 18 when said handle is forced downwardly. Sealing elements 20 are provided on the legs of the handle 16 for closing the slots in the top 8 of the container 1 when said handle is in lowered position.

It is thought that the operation of the device will be readily apparent from a consideration of the foregoing. Briefly, the closure 5 is opened and the articles to be sterilized are placed on the tray 11 in the container 1. The closure 5 is then closed and the handle 16 is forced downwardly for lowering the tray 11 into the solution in the compartment 3 against the tension of the coil springs 10. In this manner the articles on the tray 11 are immersed in the solution. The loop 17 engages the hook 18 for securing the tray in lowered position. After the articles have been immersed for a sufficient length of time, the loop 17 is disengaged from the hook 18 and the coil springs 10 raise the tray 11, with the articles thereon, out of the solution to dry. While the articles are drying they are treated with fumes from the medium in the compartment 4 for further sterilization. As hereinbefore stated, access to the compartment 4 is had through the closure 6.

It is believed that the many advantages of a sterilizer constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. A sterilizer comprising a container including communicating compartments for the reception of a disinfecting solution and a fume emitting medium, a yieldingly supported article supporting tray mounted for vertical movement in the solution compartment, and means for releasably securing the tray in lowered position.

2. A sterilizer comprising a container including communicating compartments for the reception of a disinfecting solution and a fume emitting medium, a yieldingly supported article supporting tray mounted for vertical movement in the solution compartment, and means for releasably securing the tray in lowered position, said means including a substantially U-shaped handle on the tray, and means for releasably connecting said handle to the container.

3. A sterilizer of the character described comprising a container, a partition in said container movable to provide compartments for the reception of a disinfecting solution and a fume emitting medium, closures on the container providing access to the compartments, coil springs in the solution compartment, a foraminous article supporting tray mounted on said coil springs for vertical movement in the solution compartment, a substantially U-shaped handle rising from the tray, and coacting means on the handle and the container for releasably securing the tray in lowered position in the solution compartment.

GEORGE J. KONUCIK.